May 18, 1954 J. J. KUSIV 2,678,693
ROTARY CUTTER FOR MOLDED ARTICLES
Filed Jan. 26, 1950 2 Sheets-Sheet 1

INVENTOR.
James J. Kusiv
BY
Chester Mueller
ATTORNEY

May 18, 1954     J. J. KUSIV     2,678,693
ROTARY CUTTER FOR MOLDED ARTICLES
Filed Jan. 26, 1950     2 Sheets-Sheet 2
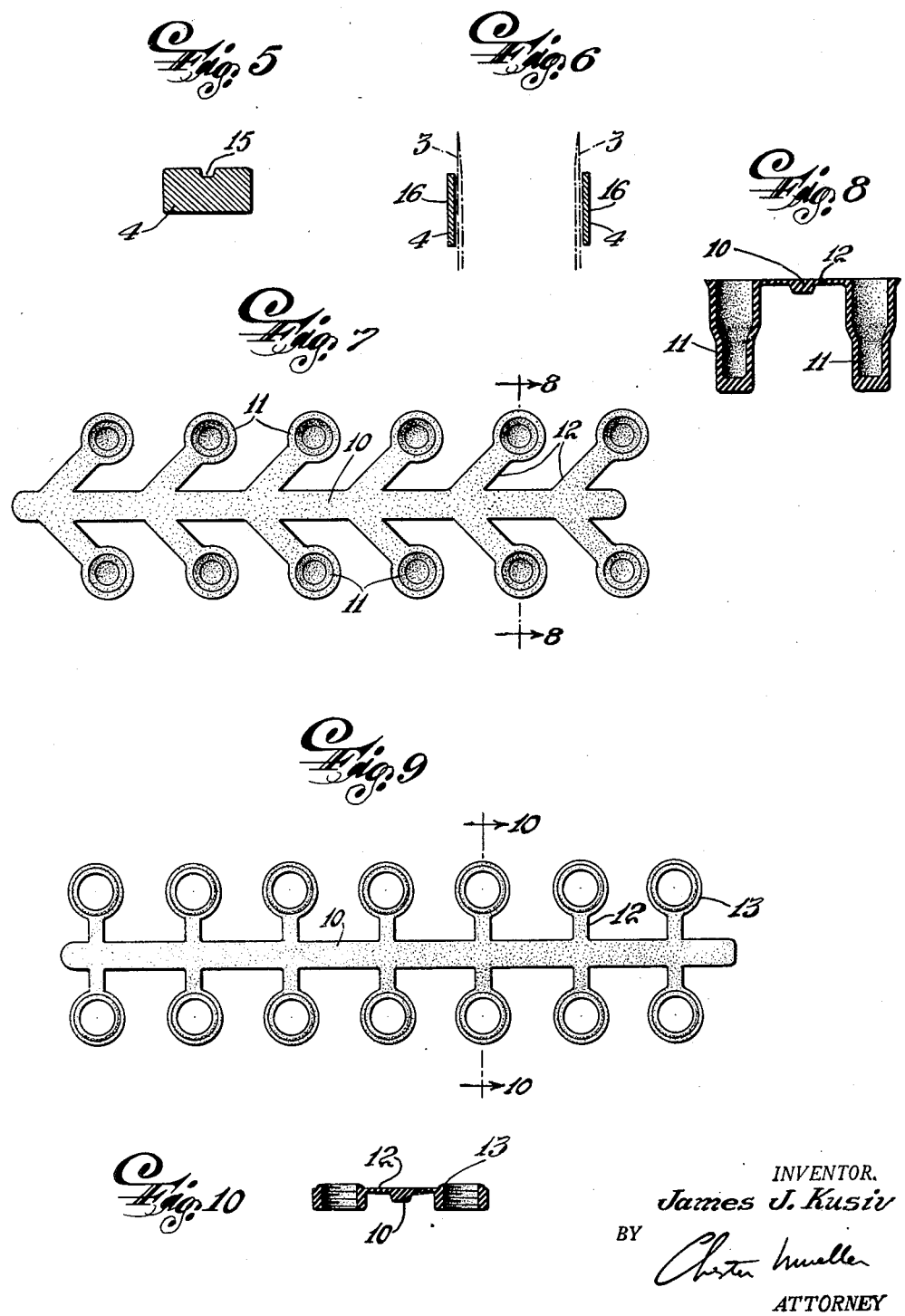
INVENTOR.
James J. Kusiv
BY
ATTORNEY Patented May 18, 1954

2,678,693

UNITED STATES PATENT OFFICE 2,678,693

ROTARY CUTTER FOR MOLDED ARTICLES

James J. Kusiv, Newark, N. J., assignor to Kenwood Engineering Co., Inc., Elizabeth, N. J., a corporation of New Jersey Application January 26, 1950, Serial No. 140,736

5 Claims. (Cl. 164—61)

This invention relates to a cutter adapted for accurately cutting flexible materials such as non-rigid plastics, rubber or the like. The particular embodiment herein described is sometimes termed, in the art, a rotary degater.

One object of this invention is to permit the high speed automatic cutting of such materials along predetermined lines in a neat and efficient manner with selective discharge of the cut pieces clear of the operating mechanism.

Another object is to provide a positive feed mechanism that will permit the insertion with safety to the operator of a strip of material into the cutting machine and feed it at a predetermined rate toward the cutting elements.

Still another object is to provide a cutter, rugged and economical in construction, having only two basic moving parts.

Other equally important objects will appear from the description which follows.

When rigid cast materials of hard rubber or the like are removed from gang moulds they are readily separated into their component castings such as by the use of cutting dies. Flexible materials, however, do not readily lend themselves to mass production methods and heretofore for the best results have required a manual cutting operation, expensive both in time and spoilage. In those cases where mechanical equipment has been employed, it has been found extremely difficult to feed a strip of flexible material toward cutting knives to secure the desired results. In this invention a multi unit moulding of flexible material may be fed through the cutter by inexperienced labor and each cast unit quickly and effectively cut away from its gate or subdivided as desired.

One embodiment of this invention is illustrated in the accompanying drawings, in which Figure 1 is a side elevational view of a cutter with outer case removed to show the internal arrangement of its parts.

Figure 5 is a section on the line 5—5 of Figure 4.

Figure 6 is a section on the line 6—6 of Figure 4 showing in dotted outline the position of the cutting wheels in the assembled cutter.

Figure 7 is a top full scale view of one particular multi unit moulding.

Figure 8 is a section on the line 8—8 of Figure 7.

Figure 9 is a top full scale view of another multi unit moulding.

Figure 10 is a section on the line 10—10 of Figure 9.

Figure 1:
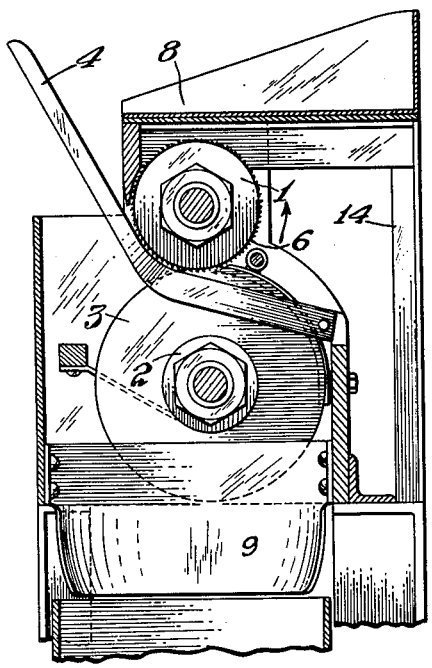

In the drawings in which the same number refers to the same or similar parts, Figures 1 to 6 inclusive illustrate the details of the cutter described herein which has been designed to perform cutting operations upon the moulding of Figures 7 and 8.

Figure 7 is a top view of a moulding as taken from a mould, comprising a number of cups 11 attached by gates 12 to runner 10. The runner and gates are sometimes referred to as a mould tree. In the cutter described the moulding is fed into the cutter over feed guide 4 so that the mould tree lies on the top surface of the guide with cups 11 straddling it.

Frame 14 of the cutter supports work tray 8 on its top and within it the various other fixed and moving parts. Rotatably mounted in the side walls of frame 14 are the two moving parts, namely, feed wheel 1 and roller 2. Upon the latter is coaxially mounted a pair of single bevel circular knives 3. Feed guide 4 is secured to the frame at such a distance from feed wheel 1 so that when the moulding of Figures 7 and 8 is laid thereon and moved toward feed wheel 1 the feed wheel will bear upon the top surface of the moulding and when rotating feed it toward the circular knives 3. To further insure a positive forward feed the peripheral surface of feed wheel 1 may be milled at 6 as illustrated, or provided with a toothed surface as hereinafter described.

Feed wheel 1 is shown with a cylindrical surface but for mouldings whose top surfaces do not lie in the same plane, the peripheral surface of feed wheel 1 may be contoured to match and the milled portion of the surface increased or decreased as desired.

Figure 2:
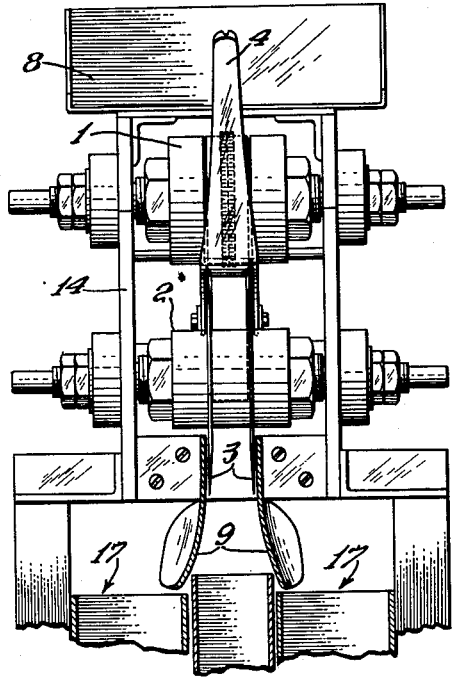
Figure 2 is a front view with cover removed.
Figure 3:
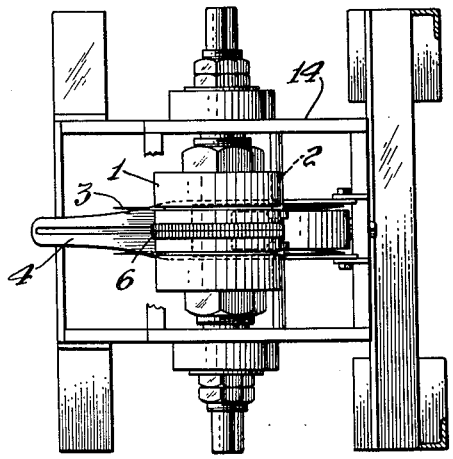
Figure 3 is a top view with work tray removed to show the relation of the feed guide to the moving parts.
Figure 4:
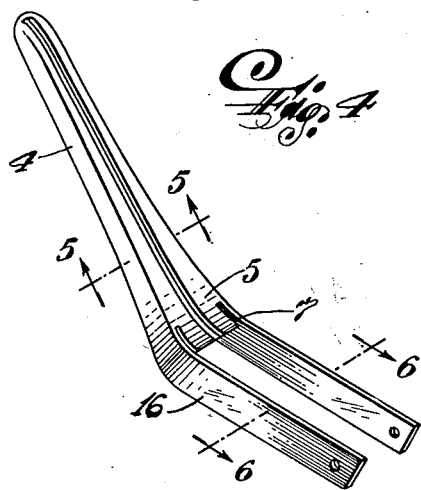
Figure 4 is a perspective view of the feed guide of the cutter of Figure 1.

As illustrated in Figures 4, 5 and 6, feed guide 4 is at its intake end of nondescript cross section, but its top surface 5 is shaped to the profile of the under surface of the moulding. As seen in Figure 5, trough 15 will accommodate the bottom surface of runner 10. By being so contoured it will compress runner 10 and gates 12 of the pliable moulding between it and feed wheel 1 to a predetermined dimension, thus insuring positive forward movement when feed wheel 1 rotates. Furthermore, this engagement of runner 10 in trough 15 makes it possible to utilize the cutter to trim a mould tree having cups 11 or the like on one side only. Feed guide 4 flares outward as it approaches the position of the knives 3, terminating in forked ends 16. At the base of the forks slots 7 are let into its surface to permit the passage of circular knives 3 through them. Deflectors 9 are secured to frame 14 to direct the cut cups 11 away from the circular knives 3 and into open ends 17 of a pair of chutes as best shown in Figure 2.

The operation of the cutter is as follows. The feed wheel 1 and roller 2 are set rotating at some suitable speed and as they rotate mouldings are fed into the cutter over feed guide 4. For convenience a stock of mouldings may be placed in work tray 8. As a moulding is fed into the cutter it is placed right side up over feed guide 4 and moved forward until it is engaged by rotating feed wheel 1. As the moulding is carried forward the outward flaring sides of feed guide 4 spread cups 11 and place the gates under some tension in addition to turning cups 11 slightly inward from a vertical position. As the moulding passes circular knives 3 they cut each cup 11 from its gate 12 at the line of junction of the cup and gate. After the cups are cut they are deflected by deflectors 9 into troughs or chutes 17 and the remaining waste piece or mould tree continues onward between the forks 16 of feed guide 4, eventually dropping between them to a waste bin beneath the cutter.

Figures 9 and 10 illustrate a moulding consisting of circular pieces 13 attached by gates 12 to runner 10. If such a moulding is to be passed through the cutter, feed guide 4 is modified accordingly and since in this moulding the gates 12 are at right angles to runner 10 it is not necessary to flare feed guide 4 outward to the extent previously described. It is, however, desirable to so shape feed guide 4 that it will present the moulding for cutting with gates 12 under some tension to provide a clean cut. While Figure 6 shows the top surface of forks 16 of appreciable width, it is sometimes desirable to knife edge such top surface to facilitate the passage of the work past them.

By suitable dimensioning of the opposing faces of the feed wheel and feed guide a pliable material passing between them may be compressed slightly as desired without impeding the passage of the material therebetween. Buckling is thus prevented and in cooperation with the sides of the feed guide the material presented for cutting in a predetermined position.

In the cutter illustrated the circular knives 3 may be rotated in the same direction as feed wheel 1 or opposite thereto as the type of moulding may dictate. Many modifications may be made such as using circular saws instead of knives or by using a hardened steel feed wheel with dull shears instead of knives to separate the castings from the mould tree.

In the cutter described certain features may be incorporated to facilitate its adjustment and adaptation for variously shaped mouldings. For example, it has been found convenient to make the feed wheel of several parts, that is, to use in place of a solid wheel milled across a fixed width, several fine toothed screw head cutters as an equivalent to the milled portion with collars to make up the balance of the wheel. Such composite wheels may be readily assembled and by varying the diameters of the several discs or collars the desired peripheral surface contour obtained.

Similarly by assembling discs having single bevel knife edges with collars and spacing washers, the roller 2 with knives 3 may be economically produced.

The mountings of both feed wheel 1 and roller 2 as it may be seen, lend themselves to ease in removal and replacement and to adjustment. Alignment of the knives in slots 7 is particularly important to produce a cut where desired. Use of a single, bevel knife edge insures the continuation of the edge in the same cutting plane even after resharpening.

Not shown in the drawings is a throated opening that may be fixed to frame 14 in advance of feed guide 4 to aid in straightening and guiding a moulding to its preliminary engagement on the feed guide. Nor is there illustrated a means for carrying the cups away from under the cutter. Instead of dropping into hoppers or bins they may be guided by an appropriate shaping of the forked ends 16 on to rollers or conveyors to prevent the interlocking that occurs with hoppering and interferes with further processing.

A modification that has been successfully used relates to the design of the feed guide at its inner end. Instead of a forked inner end it may have a continuation of its top surface, without sides depending therefrom, that will pass the scrap material over it and out of the cutter into a waste bin, permitting the cut castings to drop directly into a bin or conveyor immediately beneath the cutting elements. Many other variations in handling the material before and after cutting may be secured by altering the feed guide sides, ends and surfaces.

It is apparent that many other modifications may be made without departing from the scope of this invention and it is not intended by the illustrations herein given to limit such scope.

What I claim is:

1. A cutter device for cutting molded articles from a thin runner which is connected to a thickened gate, comprising a frame; a pair of rotary cutters coaxially mounted thereon; a rotary feed wheel mounted on the frame parallel with the rotary cutters with its rim only, rotatable between them; and a partially curved feed guide with a portion of its inward end positioned between the rotary cutters in apposition to the circumferential surface of the feed wheel, the opposing curved surfaces of the feed guide and the feed wheel being contoured to receive in close fit engagement and pass between them under slight compression the thickened gate of a molded article, the feed guide having diverging marginal surfaces that near its outer end lie between the planes in which the rotary cutters rotate and which in the proximity of the rotary cutters lie outside such planes.

2. A cutter device for cutting molded articles from a thin runner which is connected to a thickened gate, comprising a frame; a pair of rotary cutters coaxially mounted thereon; a rotary feed wheel with a rough circumferential surface mounted on the frame parallel with the rotary cutters with its rim only, rotatable between them; and a partially curved feed guide with a portion of its inward end positioned between the rotary cutters in apposition to the rough circumferential surface of the feed wheel, the opposing curved surfaces of the feed guide and the feed wheel being contoured to receive in close fit engagement and pass between them under slight compression the thickened gate of a molded article, the feed guide having diverging marginal surface that near its outer end lie between the planes in which the rotary cutters rotate and which in the proximity of the rotary cutters lie outside such planes.

3. A cutter device for cutting molded articles from a thin runner which is connected to a thickened gate, comprising a frame; a pair of rotary cutters coaxially mounted thereon; a rotary feed wheel with a rough circumferential surface mounted on the frame parallel with the rotary cutters with its rim only, rotatable between them; and a feed guide mounted on the frame with a portion of its inward end positioned between the rotary cutters in apposition to the rough circumferential surface of the feed wheel, the feed guide comprising a top surface partially curved opposite the feed wheel and having a longitudinal trough therein and slots at its inward end into which the rotary cutters extend, and sides contoured to urge dependent marginal portions of molded material passed over the feed guide, outward from the center thereof, the opposing curved surfaces of the feed guide and the feed wheel being contoured to receive in close fit engagement and pass between them under slight compression the thickened gate of a molded article.

4. A cutter device for cutting molded articles from a thin runner which is connected to a thickened gate; comprising a frame; a pair of rotary cutters coaxially mounted thereon; a rotary feed wheel with a rough circumferential surface mounted on the frame parallel with the rotary cutters with its rim only, rotatable between them; and a feed guide mounted on the frame in apposition to the feed wheel and in fixed spaced alignment with the rotary cutters and the feed wheel, the feed guide comprising a top surface increasing in width from its outward end to its inner end; a pair of slots at its inward end into which the rotary cutters extend, a curve in the top surface opposite the feed wheel, a longitudinal trough in the top surface and downward and outwardly flared walls depending from the margins of the top surface and extending astride the pair of rotary cutters a distance beyond the cutting edges thereof, the opposing curved surfaces of the feed guide and the feed wheels being contoured to receive in close fit engagement and pass between them under slight compression the thickened gate of a molded article.

5. A cutter device for cutting molded articles from a thin runner which is connected to a thickened gate, comprising a frame; a pair of rotary cutters coaxially mounted thereon; a rotary feed wheel with a rough circumferential surface mounted on the frame parallel with the rotary cutters with its rim only, rotatable between them; and a feed guide mounted on the frame with a portion of its inward end positioned between the rotary cutters in apposition to the rough circumferential surface of the feed wheel, the feed guide comprising a top surface partially curved opposite the feed wheel and having a longitudinal trough therein and slots at its inward end into which the rotary cutters extend, and a side contoured to urge dependent marginal portions of molded material passed over the feed guide and such side, outward from the center thereof, the opposing curved surfaces of the feed guide and the feed wheel being contoured to receive in close fit engagement and pass between them under slight compression the thickened gate of a molded article.

References Cited in the file of this patent

UNITED STATES PATENTS

| Number | Name | Date |
|---|---|---|
| 589,444 | Sackett | Sept. 7, 1897 |
| 1,521,376 | Krag | Dec. 30, 1924 |
| 1,854,426 | Redemske | Apr. 19, 1932 |
| 2,368,152 | McWilliams | Jan. 30, 1945 |
| 2,387,386 | Cohn | Oct. 23, 1945 |